United States Patent
Nishimura et al.

[11] Patent Number: 5,978,543
[45] Date of Patent: *Nov. 2, 1999

[54] VIDEO DISK RECORDER WHICH COMPRESSES VIDEO DATA AND INSERTS ADDRESSES OF INTRA-FRAMES INTO THE USER DATA AREA OF THE HEADERS OF THE INTRA-FRAMES

[75] Inventors: Tatsuya Nishimura, Kakogawa; Wataru Masuno, Kadoma; Hideaki Ogawa, Kyoto; Akira Yoneyama; Tatsuya Murata, both of Higashiosaka, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/801,180

[22] Filed: Feb. 18, 1997

Related U.S. Application Data

[63] Continuation of application No. 08/386,541, Feb. 10, 1995, abandoned.

[30]       Foreign Application Priority Data

Feb. 14, 1994   [JP]   Japan ................................. 66-017165

[51] Int. Cl.⁶ ........................... H04N 5/917; H04N 7/26; H04N 5/91
[52] U.S. Cl. ............................ 386/109; 386/111; 386/68
[58] Field of Search ............................... 386/107, 15, 27, 386/33, 68, 82, 109, 6–7, 81, 111–112; 348/461, 475, 473, 423

[56]              References Cited

U.S. PATENT DOCUMENTS

| | | | |
|---|---|---|---|
| 4,931,879 | 6/1990 | Koga et al. | 358/335 |
| 5,168,356 | 12/1992 | Acampora et al. | 358/133 |
| 5,282,049 | 1/1994 | Hatakenaka et al. | 358/335 |
| 5,371,602 | 12/1994 | Tsuboi et al. | 358/335 |
| 5,377,051 | 12/1994 | Lane et al. | 360/33.1 |
| 5,450,209 | 9/1995 | Niimura et al. | 358/335 |
| 5,455,684 | 10/1995 | Fujinami et al. | 358/335 |
| 5,485,213 | 1/1996 | Murashita et al. | 348/415 |
| 5,535,008 | 7/1996 | Yamagishi et al. | 358/342 |
| 5,568,274 | 10/1996 | Fujinami et al. | 386/107 |
| 5,729,651 | 3/1998 | Matsumoto | 386/95 |

FOREIGN PATENT DOCUMENTS 9407332   3/1994   European Pat. Off. .

OTHER PUBLICATIONS

Websters Dictionary, p. 77, 1984.
European Search Report and Annex issued Aug. 4, 1995 in EP 95 10 1825.
Information technology–Coding of moving pictures and associated audio for digital storage media..pp. 1–9 (numbered by examiner) 1993.

Primary Examiner—Douglas W. Olms
Assistant Examiner—David R Vincent
Attorney, Agent, or Firm—Greenblum & Bernstein P.L.C.

[57]              ABSTRACT

A recording apparatus for recording compressed video data has compressed video data generator for generating a compressed video data having a plurality of intra frames each of which has no cross-reference to any other frames, and bidirectional interpolated frames and predictive frames each of which has cross-reference to other frame. In the first cycle operation, address detector detects addresses of the intra frames and stores the detected addresses in a memory. A scan information generator generates, with reference to the stored addresses in the memory, scan information for an independent frame including one or two addresses of advanced intra frames and one or two addresses of previous intra frames. The scan information is inserted to each frame and then recorded on a disk. During the reproduce of the disk, the scan information is detected to have a quick access to the intra frame located near by.

29 Claims, 5 Drawing Sheets

VIDEO DISK RECORDER WHICH COMPRESSES VIDEO DATA AND INSERTS ADDRESSES OF INTRA-FRAMES INTO THE USER DATA AREA OF THE HEADERS OF THE INTRA-FRAMES

This application is a continuation of application Ser. No. 08/386,541, filed Feb. 10, 1995, now abandoned.

BACKGROUND OF THE INVENTION

1. Field of the Invention

The present invention relates to method and apparatus for recording and reproducing compressed moving picture video data, such as compressed video data according to MPEG standard.

2. Description of the Prior Art

The compressed data of the moving picture is recorded on a disc medium such as an optical disk or optomagnetic disk. An example of such a disk is a CD-ROM (Compact Disc-Read Only Memory) disc or CD-I (Compact Disc Interactive) disc on which the bit stream data is recorded.

Recently, in the digital signal processing field such as a video disc or digital broadcast field, much attention has been paid to an attempt to deduce a necessary amount of video data and to make the size of the recording apparatus smaller by carrying out the band compression of the video signal in a high efficiency and further to achieve a long time reproduction of the video data on the recording medium. In order to realize the attempt, there has been formed a standard called MPEG (Moving Picture Experts Group) 1.

The following description will be directed to a conventional compression data recording and reproducing apparatus for carrying out the band compression of the input video signal and the input audio signal in accordance with the MPEG1 standard.

Referring to FIG. 4, a block diagram of the conventional recording apparatus is shown. In FIG. 4, 142 is a video signal compressor for band-compressing the input video signal; 113 is an audio signal compressor for band-compressing the input audio signal; 114 is a data stream synthesizer for synchronizing the video data formed by the video signal compressor 142 with the audio data stream formed by the audio signal compressor 113 and adding address information for indicating the position on the recording medium so as to synthesize the data stream recordable on the recording medium 141; and 117 is a writer for writing the data stream synthesized by the data stream synthesizer 114 on the recording medium 141.

In operation, first, the video compressor 142 band-compresses, at a given rate, the input signal into intra frame, bidirectional interpolated frame and predictive frame to form a video bit stream. The audio compressor 113 compresses, at a given rate, the input audio signal so as to form the audio bit stream. The data bit stream synthesizer 114 synchronizes the video bit stream with the audio bit stream and adds the address indicating the position on the recording medium 141 (for example, CD-ROM disc or CDI disc of a sector structure) to the synchronizing signal so as to synthesize one data bit stream recordable on the writer 117. The synthesized data bit stream is recorded by the writer 117 in accordance with the recording format of the recording medium 141 (for example, in the case of CD-ROM disc or CD-I disc, the scramble process and the error correction process may be included).

The next description will be directed to the reproducing apparatus 150 for reproducing the recording medium 141 formed in such a way mentioned above. Referring to FIG. 5, the synthesized data bit stream recorded on the recording medium 141 is read by the data reader 123. Then, the data bit stream separator 124 separates the synthesized data bit stream into the video data bit stream and the audio data bit stream. The separated video data bit stream is transferred to a video expander 126 for decoding the compressed video data bit stream. The separated audio data bit stream is transferred to a audio expander 128 for decoding the compressed audio data bit stream. Then, the decoded video signal is output through a video output 121 to a video signal output device such as a monitor, and the decoded audio signal is output through an audio output 122 to an audio output device such as a speaker.

When reproducing the disk 141 recorded by the recording apparatus 140, the pick-up head searches for the next intra-frame (I-picture) and starts reproducing operation. Thus, it takes a while before picture appears on the screen.

Furthermore, if the pick-up head is controlled to pick-up data intermittently with a predetermined fixed interval during the fast forward or fast reverse play, it would be very difficult for the pick-up head to catch data from intra-frames, because the intra-frames are not inserted in the bit stream at a constant pitch. In this case, the image on the screen for the fast forward or fast reverse would result in poor reproduction.

SUMMARY OF THE INVENTION

The present invention has been developed with a view to substantially solve the above described disadvantages and has for its essential object to provide an improved method and apparatus for recording and reproducing compressed moving picture data.

In order to achieve the aforementioned objective, according to the present invention, a recording apparatus for recording compressed video data, comprises: compressed video data generation means for generating a compressed video data having a plurality of frames including independent frames each of which has no cross-reference to any other frames, and dependent frames each of which has cross-reference to other frame; address detection means for detecting addresses of said independent frames; memory means for storing the detected addresses of said independent frames; scan information generation means for generating, with reference to said addresses in said memory means, scan information for an independent frame including a predetermined number of addresses of neighboring independent frames; inserting means for inserting said scan information to said frames and for producing a scan information added compressed video data; and recording means for recording said scan information added compressed video data on a recording medium.

According to the present invention, a reproducing apparatus for reproducing compressed video data from a recording medium recorded by the recording apparatus of mentioned above, comprises: scan information detection means for detecting said scan information from the frames; scan information storing means for storing the detected scan information; address reading means for reading an address included in said scan information; accessing and reproducing means for accessing an independent frame in the recording medium according to said read address and for reproducing the compressed video data from the accessed independent frame.

According to the present invention, a recording method for recording compressed video data, comprises the steps of:

(a) generating a compressed video data having a plurality of frames including independent frames each of which has no cross-reference to any other frames, and dependent frames each of which has cross-reference to other frame; (b) detecting addresses of said independent frames; (c) generating, with reference to the detected addresses, scan information for an independent frame including a predetermined number of addresses of neighboring independent frames; (d) inserting said scan information to said frames and producing a scan information added compressed video data; and (e) recording said scan information added compressed video data on a recording medium.

According to the present invention, a reproducing method for reproducing compressed video data from a recording medium recorded by the recording method mentioned above, comprises the steps of: (h) detecting said scan information from the frames; (i) reading an address included in the detected scan information; (j) accessing an independent frame in the recording medium according to said read address; and (k) reproducing the compressed video data from the accessed independent frame.

According to the present invention, a recording medium recorded according to the recording method of mentioned above, comprises: an independent frame which has no cross-reference to any other frames; a plurality of dependent frames, followed by said independent frame, each dependent frame having cross-reference to other frame; and a scan information for an independent frame including a predetermined number of addresses of neighboring independent frames, said scan information inserted in each of said frames.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
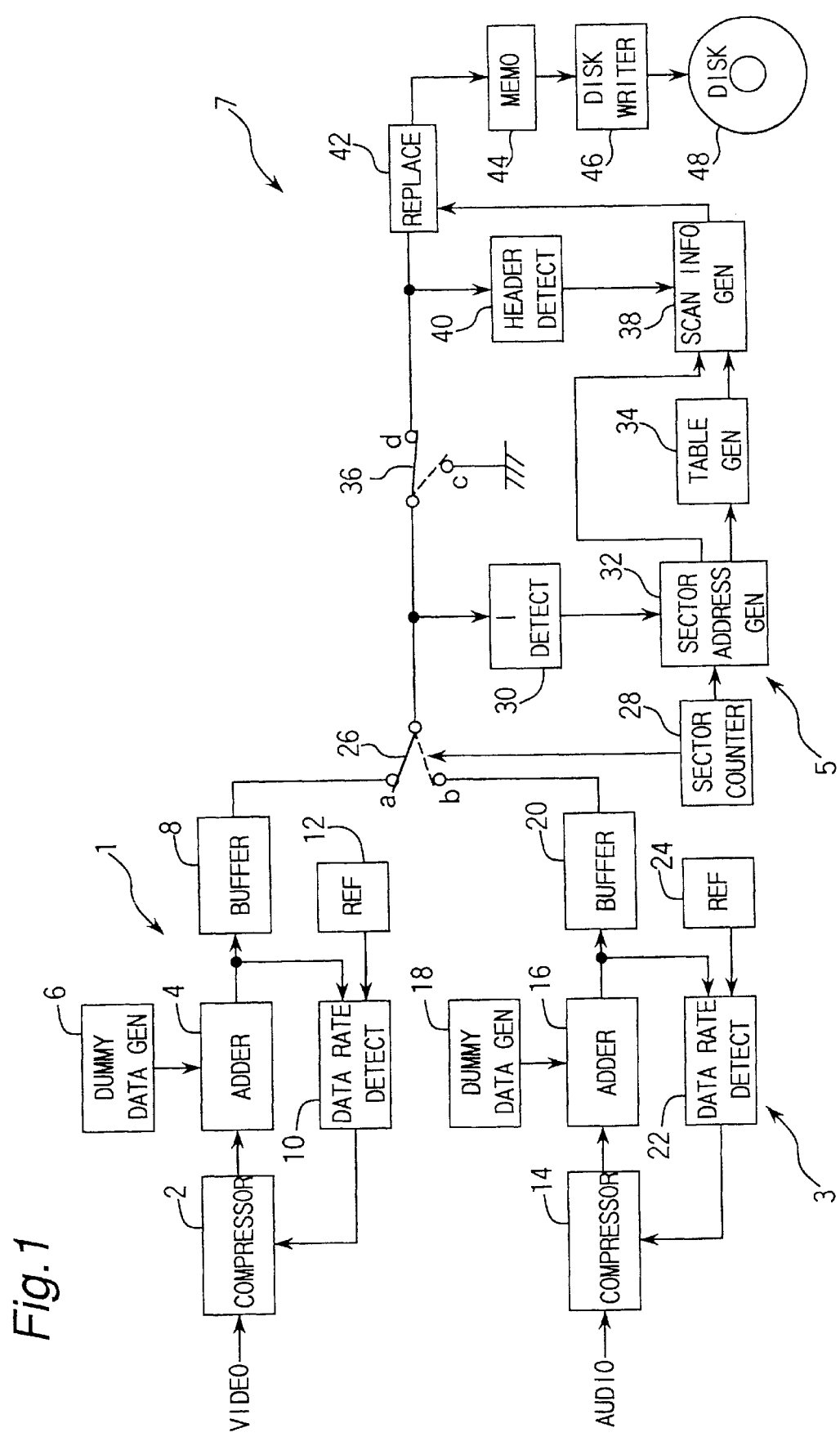
FIG. 1 is a block diagram of a compressed video data recording apparatus according to the present invention.

Referring to FIG. 1, a compressed video data recording apparatus according to the present invention is shown. The recording apparatus has a video data compression portion 1 and an audio data compression portion 3, a scan information processing portion 5 and a record processing portion 7.

The video data compression portion 1 includes: a compressor 2 for compressing the video data, such as based on MPEG standard; an adder 4 for adding a dummy data; a dummy data generator 6 for generating a dummy data; data rate detector 10 for detecting data transmission rate at the output of the adder 4; a reference rate generator 12 for generating a reference data transmission rate; and a buffer 8. The MPEG is an abbreviation of Moving Picture Expert Group, and MPEG standards include ISO/IEC CD 13818 (a committed draft of the ISO/IEC; commonly known as MPEG-2), and ISO/IEC 11172 (an international standard of ISO/IEC; commonly known as MPEG-1).

The audio data compression portion 3 includes: a compressor 14 for compressing the audio data, such as based on MPEG standard; an adder 16 for adding a dummy data; a dummy data generator 18 for generating a dummy data; data rate detector 22 for detecting data transmission rate at the output of the adder 16; a reference rate generator 24 for generating a reference data transmission rate; and a buffer 20. It is noted that the audio data generator 18 for the audio data can be omitted.

The scan information processing portion 5 includes: a switch 26 for selecting either compressed video data from terminal a or compressed audio data from terminal b; a sector counter 28 for switching the switch 26 in a predetermined sector rate, e.g., three consecutive sector periods for terminal a and one sector period for terminal b, alternatively, and also for counting the sector number from the beginning to the end of the disk recording period; an intra frame detector 30 for detecting an intra frame, which is generally indicated by I; a sector address generator 32 for generating the address of sectors that include the intra frame; a table generator 34 for generating a table which lists the address of sectors that include the intra frame, a scan information generator 38 for generating scan information based on the listed address in the table; and a switch 36 which is turned to terminal c during a trial run (first cycle) for completing the table in the table generator 34 and to terminal d during a recording run (second cycle) for actually recording data from the beginning to the end on a disk 48.

The record processing portion 7 includes: a header detector 40 for detecting a header H1 of a group of pictures (GOP) and a header H2 of pictures (including I-picture, P-picture and B-picture); a replacer 42 for replacing the dummy data with the generated scan information; a memory 44 for storing the replaced data; and a disk writer 46 for writing the data on the disk 48.

Figure 3:
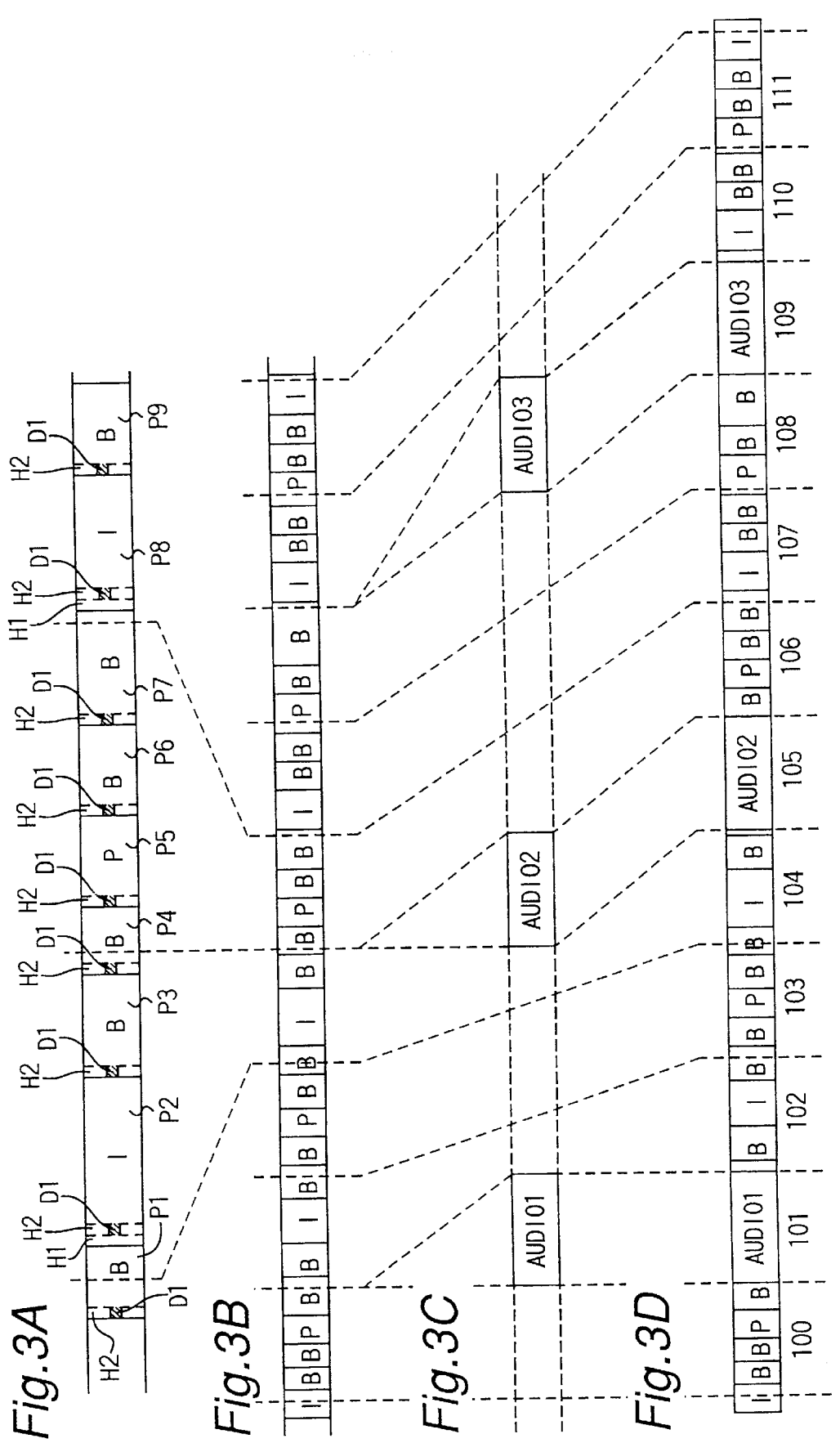
FIGS. 3A, 3B, 3C and 3D are diagrams showing bit streams.
Figure 4:
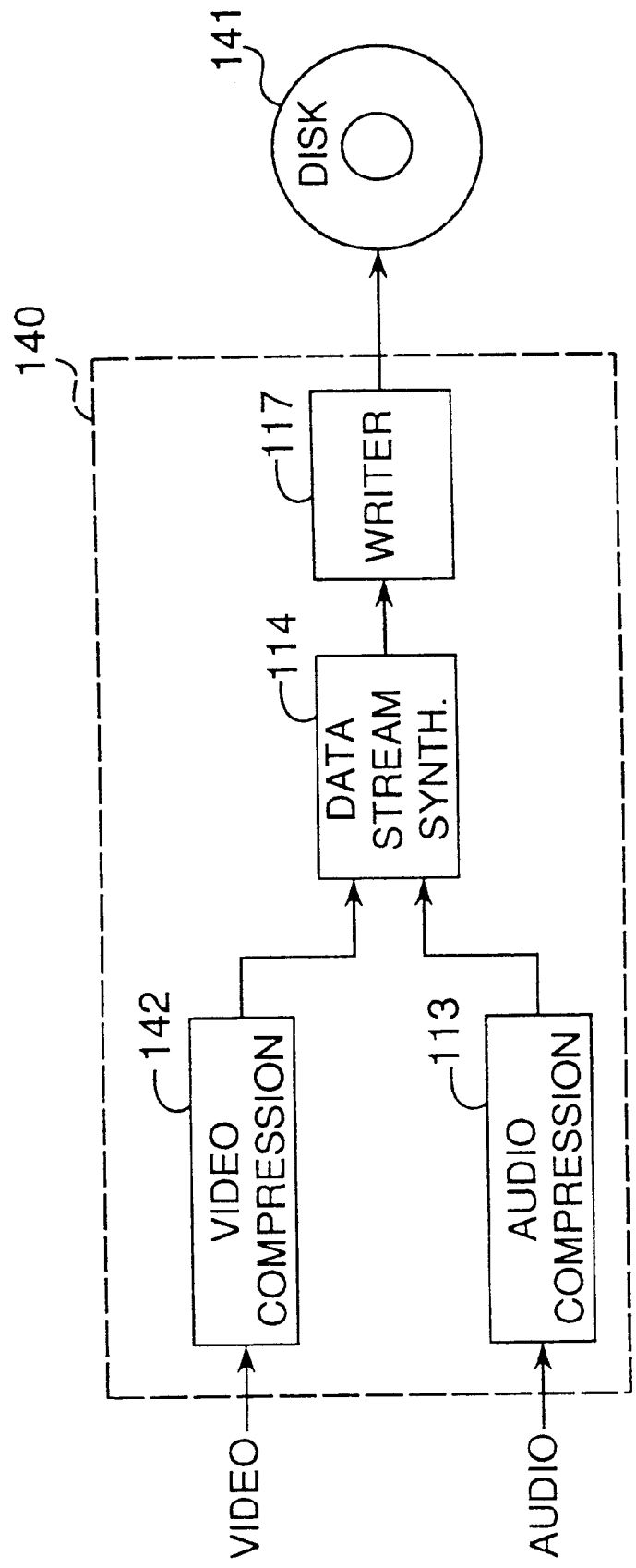
FIG. 4 is a block diagram of a compressed video data recording apparatus according to the prior art.
Figure 5:
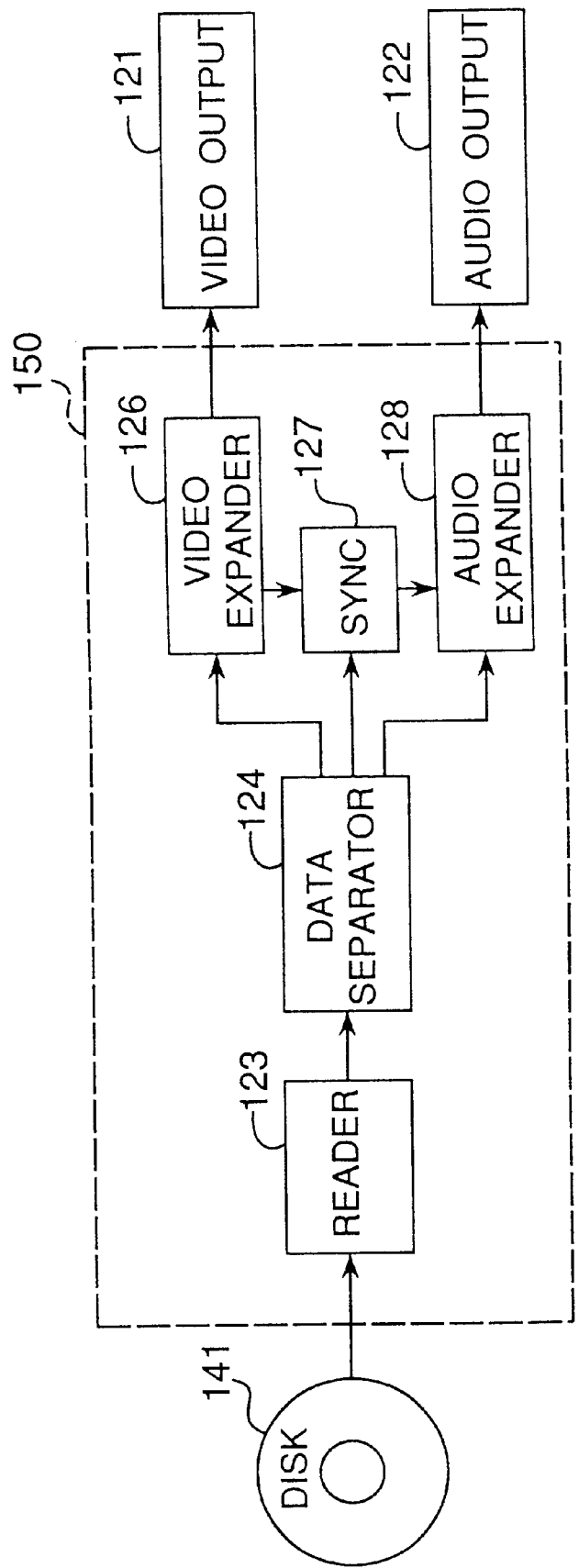
FIG. 5 is a block diagram of a compressed video data reproducing apparatus according to the prior art.

In operation, compressor 2 produces compressed video data bit stream, such as show in FIG. 3B. Compressor 2 according to the embodiment shown employs MPEG standard, but any other compression method can be used. The compressed video data bit stream includes an I-picture (intra frame), B-picture (bidirectional interpolated frame) and P-picture (predictive frame), which are produced in a pattern I,B,B,P,B,B, repeatedly, a shown in FIG. 3B. The frames in the pattern I,B,B,P,B,B are called a group of pictures (GOP). The I-picture includes one complete data for one frame and can reproduce one frame picture by itself. The B-picture includes data for one frame, but can not reproduce one frame picture by itself. Similarly, the P-picture includes data for one frame, but can not reproduce one frame picture by itself. Thus, the I-picture can be considered as an independent frame that can reproduce by itself, and B-picture and P-picture can be considered as a dependent frame that requires to make reference of other frame. This is further explained below.

In the moving picture, the image of the present frame and the image of the next frame are very similar, only a small change is observed due to the change of the moving element. In the I-picture, one complete data for One frame is provided, so that one frame picture can be produced by the data in the I-picture only. The P-picture is a data representing a difference between the picture data in the I-picture and the picture data in the P-picture, in the same GOP. The B-picture is a data representing a combination of a difference between the picture data in the I-picture and the picture data in the B-picture, and a difference between the picture data in the P-picture and the picture data in the B-picture, all in the same GOP. Therefore, to reproduce the P-picture, it in necessary to use the data in the I-picture, and to reproduce the B-picture, it is necessary to use the data in the I-picture and B-picture. However, to reproduce the I-picture, no referencing is required, I-picture can reproduce by itself.

As shown in FIG. 3A, each of I-picture, B-picture and P-picture has a header H2, and a GOP has a header H1. Each header H2 has a user data area D1 to which a dummy data generated by dummy data generator 6 is written in adder 4. Dummy data can be any data, such as "000 . . . 000", so that a space required for entering scan information at a later stage, i.e., at replacer 42, is reserved. Adder 4 further adds other data, such as parity check data.

Data produced from adder 4 is observed by data rate detector 10 which compared the data rate at the output of adder 4 with a predetermined data speed obtained from reference rate generator 12. When the data rate is less or greater than the predetermined data speed, compression rate is changed to keep the data rate substantially equal to the predetermined data speed. The data is temporarily stored in buffer 8 and in applied to terminal a.

While the compressor 2 is compressing and producing the compressed video data, compressor 14 produces compressed audio data bit stream, such as show in FIG. 3C. Since the amount of data in the audio data is less than that in the video data, the compressed audio data are produced intermittently. The compressed audio data is also added at adder 16 with the dummy data generated by dummy data generator 18 at an appropriate place. The data rate of the data from adder 16 is controller to be substantially equal to a predetermined speed by data rate detector 22 and reference rate generator 24 in the same manner described above. The data from adder 16 is temporarily stored in buffer 20 and is applied to terminal b.

It in noted that the compressed audio data may not be inserted with the dummy data. In this case, the dummy data generator 18 can be eliminated, but adder 16 is still necessary for inserting other data, such as parity check data.

Sector counter 28 counts a predetermined number of bits, such as 2324 byte including a sector header, for one sector data to be recorded on the disk 48, and controls the switching operation between terminals a and b. According to the present embodiment, switch 26 is turned to terminal a for three sector periods, and turned to terminal b for one sector period. Thus, switch 26 produces bit stream of combined compressed video and audio data such that the audio data of one sector period is inserted ever after three sector periods of video data, as shown in FIG. 3D.

Sector address generator 32 receives a signal at the beginning of each sector and produces a sector address from the beginning to the end of the data that is to be recorded on the disk 48. In FIG. 3D, an example of such a sector address, 100, 101, 102, . . . , 111, is given to each sector. Alternatively, the sector address may be given by mm:ss:ff in which mm represents minute, ss represents second and ff represents frame, noting that there are 72 frames in one second.

While the sector address is generated by the sector address generator 32, I-picture detector 30 detects I-picture from the bit stream produced from switch 26, and provides a signal indicative of presence an I-picture to sector address generator 32. Thus, the sector address generator 32 provides sector addresses for all the detected I-pictures to table generator 34. If an I-picture is separated into two subsequent sectors, the former sector receiving the leading portion of the I-picture and the latter sector receiving the trailing portion of the I-picture, the sector address of the latter sector in which the trailing portion is captured will be generated and sent to table generator 34. In the case shown in FIG. 3D, table generator 34 generates the following Table 1.

TABLE 1

:
100
102
104
107
110
:

Note that the sector addresses listed in Table 1 are the sectors containing I-picture.

Although not shown in FIG. 1, output of switch 26 is connected with an adder for adding a sector header.

When Table 1 is completed or while making Table 1, scan information generator 34 generates scan information for each of the I-picture by collecting the addresses of a predetermined number of neighboring I-pictures. For example, the scan information may be addresses of two I-pictures ahead and two I-pictures before are collected for each I-pictures. With respect to the example shown in Table 1, the following data are collected as the scan information.

TABLE 2

| I-picture 100 | |
|---|---|
| ahead 1: | 102 |
| ahead 2: | 104 |
| before 1: | — |
| before 2: | — |

TABLE 3

| I-picture 102 | |
|---|---|
| ahead 1: | 104 |
| ahead 2: | 107 |
| before 1: | 100 |
| before 2: | — |

TABLE 4

| I-picture 104 | |
|---|---|
| ahead 1: | 107 |
| ahead 2: | 110 |
| before 1: | 102 |
| before 2: | 100 |

TABLE 5

| I-picture 107 | |
|---|---|
| ahead 1: | 110 |
| ahead 2: | 112 |
| before 1: | 104 |
| before 2: | 102 |

TABLE 6

| I-picture 110 | |
| --- | --- |
| ahead 1: | 112 |
| ahead 2: | — |
| before 1: | 107 |
| before 2: | 104 |

TABLE 7

| I-picture 112 | |
| --- | --- |
| ahead 1: | — |
| ahead 2: | — |
| before 1: | 110 |
| before 2: | 107 |

Tables 2, 3, 4, 5, 6 and 7 shows the scan informations for the I-pictures in sectors 100, 102, 104, 107, 110 and 112, respectively. For example, Table 4 shows that with respect to the I-picture in sector 104, one ahead I-picture is located at sector 107, two ahead I-picture is located at sector 110, one before I-picture is located at sector 102 and two before I-picture in located at sector 100.

The scan information as shown in Tables 2–7 can be stored in a memory, or can be generated whenever it is necessary by making reference to Table 1.

During the first cycle for completing Table 1, switch 36 is turned to terminal c to expel the bit steam data thereat. When Table 1 is completed to list all the addresses of I-pictures, switch 36 is turned to terminal d and the same bit steam data (FIG. 3D) as in the first cycle is again produced from switch 26 from the very beginning.

During the second cycle, header detector 40 detects headers H1 of GOPs and headers H2 of pictures (including I-picture, P-picture and B-picture). When header H1 is detected, it is understood that an I-picture follows immediately after the header H1. Therefore, the detection of headers H1 is substantially the same as detection of I-pictures. In response to the detection of header H1, the scan information generator 38 catches the address of the sector in which the I-picture is located, and generates the scan information corresponding to that I-picture. The generation of the scan information can be done by making reference to Table 1 or by reading the memory already stored with various scan informations.

Then, when the header detector 40 detects header H1 that follows the detected header H2, the user data area D1 in the header H1 in detected. It is noted that in the user data area, dummy data is stored by adder 4 and dummy data generator 6. Upon detection of the user data area by header detector 40, scan information generator 38 supplies the generated scan information to replacer 42, at which the dummy data is replaced with the scan information. In this manner, every time the user data area D1 is detected in the same GOP, the same scan information is replaced with the dummy data in picture headers H1. Thus, according to the example shown in FIG. 3A, the dummy data in user data area D1 in each of pictures P2, P3, P4, P5, P6 and P7 is replaced with scan information shown in Table 4, which is for the I-picture in sector 104. Similarly, the dummy data in user data area D1 in each of pictures P8, P9, . . . is replaced with scan information shown in Table 5, which is for the I-picture in sector 107.

If the dummy data is present in the sector with audio data, such dummy data is also replaced with the scan information. For example, the dummy data in audio data AUDIO2 in sector 105 in FIG. 3D is replaced with the scan information shown in Table 4, which is for the I-picture in sector 104.

After the dummy data are replaced with appropriate scan informations, the bit stream is temporarily stored in memory 44 and written on the disk 48 by disk writer 46.

It is noted that the intra frame detector 30, which has been described as connected to the output of switch 26, can be connected directly to buffer 8. In this case, since the switching pattern of switch 26 is previously, sector address generator 32 can generate the address of the intra frame without any problem.

Figure 2:
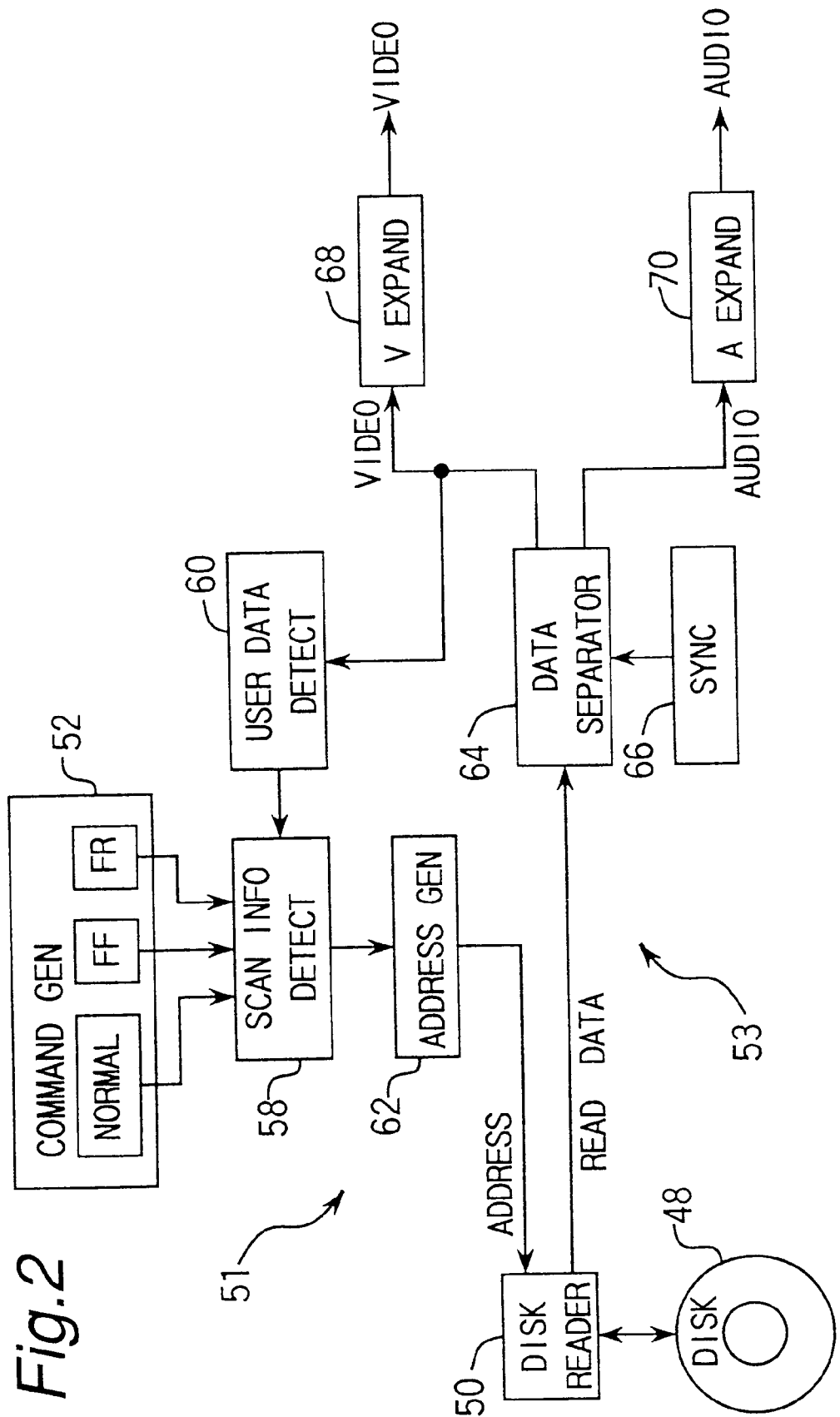
FIG. 2 is a block diagram of a compressed video data reproducing apparatus according to the present invention.

Referring to FIG. 2 a compressed video data reproducing apparatus according to the present invention is shown. The reproducing apparatus has an address generating portion 51 and a data reading portion 53.

The address generating portion 51 includes: a user data detector 60 for detecting the user data area in each picture from a reproduced compressed video data; a scan information detector 58 for detecting the scan information; a command generator 52 for generating a normal speed replay command, fast forward replay command (FP command), or fast reverse replay command (FR command) by the request of an operator; and an address generator 62 for generating access address. The FF command has two levels, moderate fast and extreme fast. The FR command has similar two levels.

The data reading-portion 53 includes: a disk reader 50 for receiving the access address from access generator 62 and reading the disk at the accessed position; data separator 64 for separating the read data into compressed video data and compressed audio data using sync pulse from sync pulse generator 66; a compressed video signal expander 68 for expanding compressed video signal; and a compressed audio signal expander 70 for expanding compressed audio signal.

In operation, when the normal speed replay command is produced from command generator 52 from a mid of the disk, such as from picture P5, the scan information in the scan information detector 58 is first read to obtain the address of the next I-picture, which would be in this case, in sector 107. Thus, the address generator 62 generates address 107 to have an immediate access to sector 107. Thereafter, the address generator 62 is generates sequential address without any address skip. Thus, the disk is read by disk reader 50 linearly at the normal replay speed. The read data is separated by data separator 64 into compressed video data and compressed audio data which are applied to respective expanders 68 and 70 for producing normal video signal and audio signal. According to the present invention, since the pick-up head can be accessed to the I-picture immediately without any searching operation, the image on the screen appears instantaneously.

It is noted that during the replay (including normal, PF and FR) the user data detector 60 detects the user data D1 from each picture, and the scan information detector 58 extracts the scan information from the detected user data D1. The extracted scan information is overwritten on the old scan information in the scan information detector 58.

When the moderate FF command is produced from command generator 52, the address in the scan information particular under "ahead 1" is read from the scan information detector 58 and is applied through address generator 62 to disk reader 50. Thus, the disk reader 50 reads the address indicated at "ahead 1" that is where the next I-picture is located. When said next I-picture is accessed and read out, the scan information from that I-picture is read and stored in scan information detector 58. Then again, the address in "ahead 1" is read and accessed. In this manner, when the moderate FF command is selected, the video data from I-pictures are produced, resulting in the moderate fast forward replay. For example, when the data pick-up head of the disk reader 50 is paused at picture P5, shown in FIG. 3A, the scan information stored at scan information detector 58 is the one that shown in Table 4. In this came, the data pick-up head advances to sector 107 to have an access to I-picture P8, and then to the next I-picture in sector 110.

When the extreme FF command is produced from command generator 52, the address in the scan information particularly under "ahead 2" is read from the scan information detector 58 and in applied through address generator 62 to disk reader 50. The disk reader 50 reads the address indicated at "ahead 2", that is where the second advanced I-picture is located. The disk is reproduced twice as fast as the moderate FF.

Similar operations are carried out for the moderate PR and extreme PR.

According to the present invention, since the I-pictures, which are the pictures that can be reproduced by itself, are accessed without any specific searching operation, the image on the screen appears quickly and can be played smoothly without any interruption.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recording apparatus for recording compressed video data, comprising:

compressed video data generation means for generating compressed video data having a plurality of imageable video frames including independent video frames, each of said independent video frames not being cross-referenced to any other imageable video frames, and dependent video frames, each of said dependent video frames being cross-referenced to at least one other imageable video frame, every said imageable video frame including a video frame header that defines the imageable video frame, and every said video frame header including a user data area;

address detection means for detecting addresses of said independent video frames;

memory means for storing the detected addresses of said independent video frames;

scan information generating means for generating, with reference to said detected addresses in said memory means, scan information for an independent video image frame, said scan information including said detected addresses of a predetermined number of neighboring independent video frames;

inserting means for inserting said scan information into aid user data area within said video frame header of at least said independent video frames and for producing scan information added compressed video data of said imageable video frames including said scan information within said user data area within said video frame headers within at least said independent video frames; and recording means for recording said scan information added compressed video data on a recording medium.

2. A recording apparatus as claimed in claim 1, further comprising switching means for switching between a first cycle for filling said memory means with the detected addresses of said independent video frames, and a second cycle after said first cycle for inserting said scan information by said inserting means.

3. A recording apparatus as claimed in claim 1, further comprising dummy data adding means for adding dummy data to said user data area of said video frame headers of at least said independent video frames, and wherein said inserting means comprises a replacing means for replacing said dummy data with said scan information.

4. A recording apparatus as claimed in claim 1, wherein said scan information includes addresses of at least one following independent video frame and at least one preceding independent video frame.

5. A recording apparatus as claimed in claim 1, wherein said inserting means inserts said scan information to a video frame header area in each of said imageable video frames.

6. A recording apparatus as claimed in claim 1, wherein said compressed video data generation means generates an MPEG standard compressed video data having a plurality of imageable video frames, and wherein said independent vide frame is an intra frame and said dependent video frame is either one of a bidirectional interpolated frame and a predictive frame, and wherein said intra frame is followed by a plurality of bidirectional interpolated frames and predictive frames, all taken together defining a group of pictures (GOP).

7. A recording apparatus as claimed in claim 1, wherein said inserting means inserts the same scan information into all user data areas within all video frame headers of said intra frames, bidirectional interpolated frames, and said predictive frames in a same one of said group of pictures.

8. A reproducing apparatus for reproducing compressed video data from a recording medium recorded by the recording apparatus of claim 1, comprising:

scan information detecting means for detecting said scan information from said user data area within the plurality of imageable video frames;

scan information storing means for storing the detected scan information;

address reading means for reading an address included in said scan information;

accessing and reproducing means for accessing an independent video frame in the recording medium according to said read address and for reproducing the compressed video data from the accessed independent video frames.

9. A reproducing apparatus as claimed in claim 8, further comprising selecting means for selecting one reproducing mode from a plurality of modes of a normal reproducing mode, a fast forward mode and a fast reverse mode.

10. A recording method for recording compressed video data, comprising the steps of:

generating a compressed video data having a plurality of imageable video frames including independent video frames, each of said independent video frames not being cross-referenced to any other imageable video frames, and dependent video frames, each of said dependent video frames being cross-referenced to at least one other imageable frame, every said imageable video frame including a video frame header that defines the imageable video frame, and every said video frame header including a user data area;

detecting addresses of said independent video frames;

generating, with reference to the detected addresses, scan information for at least an independent video frame, said scan information including said detected addresses of a predetermined number of neighboring independent video frames;

inserting said scan information into user data area within said video frame header of said at least independent video frames and producing scan information added compressed video data of said imageable video frames including said scan information within said user data area within said video frame headers within at least said independent video frames; and recording said scan information added compressed video data on a recording medium.

11. A recording method as claimed in claim 10, further comprising the step of:

adding dummy data to said user data area of said video frame headers of at least said independent video frames; and replacing said dummy data with said scan information.

12. A reproducing method for reproducing compressed video data from a recording medium recorded by the recording method of claim 10, comprising the steps of:

detecting the scan information from the imageable video frames;

reading an address included in the detected scan information;

accessing an independent video frame in the recording medium according to said read address; and reproducing the compressed video data from the accessed independent video frame.

13. A recording medium recorded according to the method of claim 10, comprising:

an independent video frame, each of said independent video frames not being cross-referenced to any other imageable video frames;

a plurality of dependent video frames, following said independent video frame, each of said dependent video frames being cross-referenced to at least one other imageable video frame, every said independent video frame and dependent video frame including a video frame header that defines the video frame, and every said video frame header including a user data area; and scan information for an independent video frame including a predetermined number of addresses of neighboring independent video frames, said scan information being inserted in each of said user data areas within said video frame headers within at least said independent video frames.

14. A recording medium as claimed in claim 13, wherein said scan information is inserted in each of said user data areas within said video frame headers within said independent video frames and within said dependent video frames.

15. A recording medium as claimed in claim 13, wherein said scan information includes addresses of at least one following independent video frame and at least one preceding independent video frame.

16. The recording apparatus according to claim 1, said address detection means comprising:

an intra frame detector for detecting said independent video frames and outputting a signal indicative of the presence of said independent video frames; and a sector address generator for generating addresses of sectors which include said independent video frames based on said signal outputted from said intra frame detector, and for inputting said addresses to said memory means.

17. The recording apparatus according to claim 8, said address reading means comprising an address generator for sequentially generating addresses, wherein said accessing and reproducing means linearly accesses said recording medium in accordance with said sequential addresses.

18. The recording method according to claim 10, said step of detecting addresses further comprising the steps of:

receiving signals representative of beginnings of sectors which include said independent video frames;

producing sector addresses based on said received signals; and outputting, to a table generator, said sector addresses.

19. The recording apparatus of claim 1, wherein said scan information comprises absolute sector addresses of said neighboring independent video frames.

20. The recording apparatus of claim 3, wherein said dummy data is inserted when a header area of a group of pictures is detected by said dummy data adding means.

21. The reproducing apparatus of claim 8, wherein said scan information comprises an absolute sector address of said accessed independent video frame.

22. The recording method of claim 10, wherein said scan information comprises absolute sector addresses of said neighboring independent video frames.

23. The recording method of claim 11, wherein adding said dummy data to said imageable frames is performed after a detecting a header area of a group of pictures.

24. The recording apparatus of claim 1, wherein the scan information is inserted into the user data area of the video frame headers of both independent video frames and dependent video frames.

25. The recording apparatus of claim 1, wherein the scan information is inserted into the user data area of the video frame headers of all imageable video frames.

26. The recording apparatus of claim 1, wherein the scan information is inserted into the user data area of the video frame headers of the dependent video frames.

27. The recording method of claim 10, wherein the scan information is inserted into the user data area of the video frame headers of both independent video frames and dependent video frames.

28. The recording method of claim 10, wherein the scan information is inserted into the user data area of the video frame headers of all imageablevideo frames.

29. The recording method of claim 10, wherein the scan information is inserted into the user data area of the video frame headers of the dependent video frames.

* * * * *

UNITED STATES PATENT AND TRADEMARK OFFICE
CERTIFICATE OF CORRECTION

PATENT NO. : 5,978,543
DATED : November 2, 1999
INVENTOR(S) : T. NISHIMURA et al.

It is certified that error appears in the above-identified patent and that said Letters Patent is hereby corrected as shown below:

On the cover of the printed patent, at item [30], Foreign Application Priority Data, change "66-017165" to —-6-017165—-.

Signed and Sealed this

Twenty-fifth Day of July, 2000

Attest:

Q. TODD DICKINSON

*Attesting Officer*   *Director of Patents and Trademarks*